(12) United States Patent
Huber et al.

(10) Patent No.: US 7,470,112 B2
(45) Date of Patent: Dec. 30, 2008

(54) SPLIT FRANCIS TURBINE RUNNER

(75) Inventors: Paul Huber, Laval (CA); Andre Coutu, Boucherville (CA); Eric Theroux, Les Cedres (CA); Julien Morin, Laval (CA); Mario Hamel, Pierrefonds (CA)

(73) Assignee: General Electric Canada, Mississauga (CA)

( * ) Notice: Subject to any disclaimer, the term of this patent is extended or adjusted under 35 U.S.C. 154(b) by 203 days.

(21) Appl. No.: 11/457,196

(22) Filed: Jul. 13, 2006

(65) Prior Publication Data

US 2007/0134098 A1    Jun. 14, 2007

(30) Foreign Application Priority Data

Jul. 14, 2005    (CA) .................................... 2512126

(51) Int. Cl.
  *F04D 29/38*    (2006.01)
(52) U.S. Cl. .................................... 416/186 R; 416/208
(58) Field of Classification Search ................. 416/191, 416/208, 185, 186 R; 415/215.1
  See application file for complete search history.

(56) References Cited

U.S. PATENT DOCUMENTS 3,973,876 A    8/1976    Eyster et al.

FOREIGN PATENT DOCUMENTS

JP    55123374 A    *    9/1980

* cited by examiner

*Primary Examiner*—Edward Look
*Assistant Examiner*—Dwayne J White
(74) *Attorney, Agent, or Firm*—GE Global Patent Operation

(57) ABSTRACT

A split runner for a Francis turbine has runner segments that are adapted to be joined together along confronting surface portions thereof to form a composite runner having a crown, a band and a plurality of blades extending between the crown and the band. The confronting surface portions of the runner segments are located only along portions of the crown and portions of the band, and the confronting surface portions of the runner segments are located in between and spaced from adjacent blades of the composite runner. Since the confronting surface portions are located only along portions of the crown and portions of the band, none of the blades are split eliminating the need to weld together blades during formation of the composite runner. Accordingly, the composite runner does not have weld joints formed in the blades which are highly stressed operating parts of the runner.

7 Claims, 1 Drawing Sheet

SPLIT FRANCIS TURBINE RUNNER

FIELD OF THE INVENTION

The present invention relates to Francis type turbine runners and in particular to a split Francis type runner.

BACKGROUND OF THE INVENTION

A runners for a Francis turbine comprises a crown, band and plurality of turbine blades extending between the crown and the band. During manufacture, the blades are usually fastened to the crown and band by welds. When the diameter of the runner starts to exceed 5 meters, for example, it is known to split the turbine runner into two segments divided from each other by a plane passing along the axis of the runner so as to permit the runner to be transported from the manufacturing site to the dam site. This radial plane cuts through the crown, the band and portions of some of the blades.

At the dam site, the split runner segments are assembled by making welding joints at the crown, the band and the split blades. The welding of the blades requires great care due the stresses that are to be placed on the blades during turbine operation. These weld joints are typically made with a filler metal base material of CA-6NM which is an iron-chromium-nickel-molybdenum alloy that is hardened by post weld heat treatment. During post weld heat treatment, the weld joints are susceptible to cracking which requires reprocessing of the welded joint until no cracks in the joints are present.

Accordingly any improvement in manufacture of the split runner for a Francis type turbine that does not lead to weld joints in the runner blades and the potential cracking of the blade joints during a post weld heat treatment would be advantageous.

SUMMARY OF THE INVENTION

The present invention relates to a split runner for a Francis turbine comprising at least two runner segments that are adapted to be joined together along confronting surface portions thereof to form a composite runner having a crown, a band and a plurality of blades extending between and attached to the crown and the band. The improvement of the present invention relates to the confronting surface portions of the runner segments being located only along portions of the crown and portions of the band, and the confronting surface portions of the runner segments being located in between and spaced from adjacent blades of the composite runner. Since the confronting surface portions are located only along portions of the crown and portions of the band, none of the blades are split thereby eliminating welding of the blades during formation of the composite runner at the dam site. Accordingly, the composite runner does not have weld joints formed in the blades which are the more highly stressed operating parts of the runner.

In one embodiment, the runner segments are joined together by a welded joint. This welding may comprise partial penetration welding. In an alternative embodiment, the crowns of the runner segments may be joined by mechanical fasteners such as bolts and nuts. Further it is envisaged that the weld material that is utilized in the welded joint is a material that does not require post weld heat treatment. Such a material is, for example, E309L welding material.

BRIEF DESCRIPTION OF THE DRAWINGS

For a better understanding of the nature and objects of the present invention reference may be had to the following detailed description when taken in conjunction with the accompanying diagrammatic drawings in which.

DETAILED DESCRIPTION OF THE INVENTION

Figure 1:
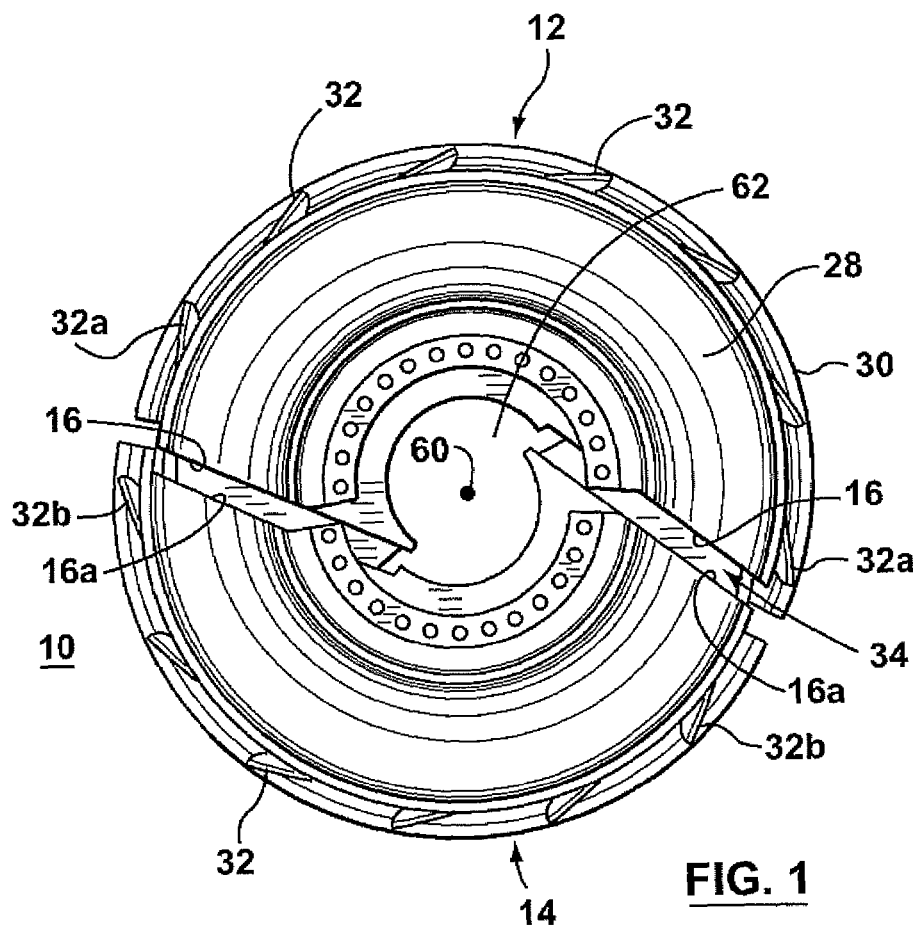
FIG. 1 is a plan view of a split runner for use in a Francis turbine.
Figure 2:
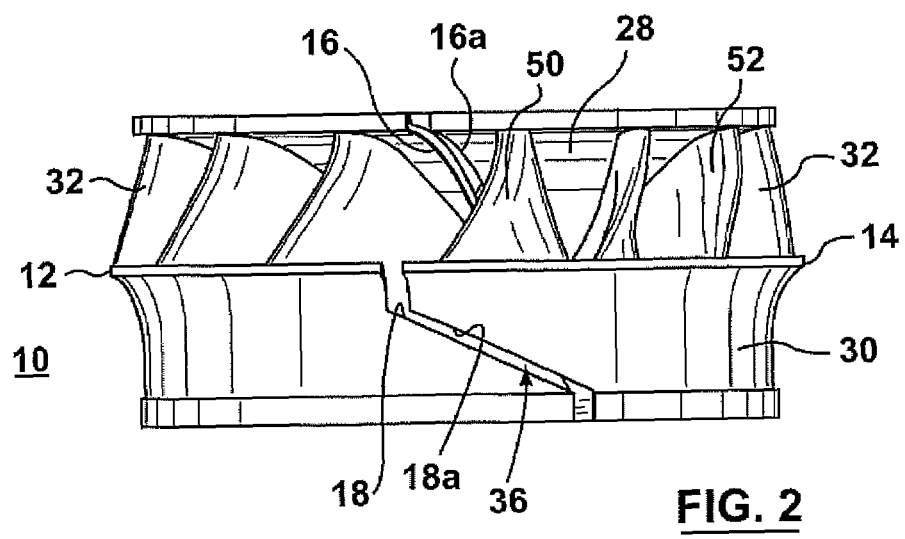
FIG. 2 is a side view of the split runner of FIG. 1.

The present invention relates to Francis type turbine runners for use in water turbines and in particular it relates to a split Francis type runner 10. The split runner 10 is shown in FIGS. 1 and 2 to comprise two runner segments 12 and 14. In these Figures the two runner segments 12 and 14 are shown spaced apart. During manufacture at the manufacturing site the segments are typically machined touching each other. Also, at the dam site, the segments 12 and 14 will be in contact with each other when weld joints between the segments are made to from a composite runner.

In accordance with the present invention, these runner segments 12 and 14 are adapted to be joined together along crown confronting surface portions 16 and 16a and band confronting surface portions 18 and 18a to form a composite runner. It should be understood that the drawings show the split runner 10 in two segments and that the runner may be split into more than two segments. However, the number of segments should be minimized since each additional segment requires more assembly at the dam site. Clearly, the number of segments chosen is determined by the size of the runner and the limitations placed on transporting the runner segment along the transportation route taken from the manufacturing site to the dam site.

The composite runner comprises a crown 28, a band 30 and a plurality of blades 32 extending between and attached to the crown 28 and the band 30.

The confronting surface portions 16, 16a and 18, 18a of the runner segments 12, 14 are located only along portions 34 of the crown 28 and portions 36 of the band 30. The confronting surface portions 16, 16a and 18, 18a, of the runner segments 12 and 14 are located in between and spaced from adjacent blades 32a and 32b of the runner 10. Each of the blades 32 is shown in the drawings to curve along opposing surfaces 50, 52 with a predetermined contour. The confronting surface portions 16, 16a (FIG. 2) and 18, 18a also extend along contours similar to the blade contour adjacent the crown 28 and adjacent the band 30. Preferably, the confronting surface portions 16, 16a and 18, 18a, are located midway between the adjacent blades 32a, 32b, that is where the blades 32a, 32b meet the crown 28 and band 30. This places the weld joints at an optimum distance away from the more highly stressed blades.

As best seen in FIG. 1, the split runner 10 and resultant composite runner has a central axis 60 and the crown 28 has a central circular shaped opening 62. The confronting surface portions 16, 16a of the crown 28 in the plan view of FIG. 1 extend from the central opening 62 radial offset from the central axis 60.

The runner segments 12 and 14 are joined together by a welded joint which is located between the confronting surface portions 16, 16a, and 18, 18a. Preferably the weld material utilized in the welded joint does not require post weld heat treatment and comprises E309L weld material. This welding process may comprise partial penetration welding.

While the invention has been described in terms of very specific embodiments, those skilled in the art will recognize that the invention can be practiced with modification that fall within scope of the appended claims.

What is claimed is:

1. A split runner for a Francis turbine, comprising:
at least two runner segments that are adapted to be joined together along confronting surface portions thereof to form a composite runner having a crown, a band, and a plurality of blades extending between and attached to the crown and the band, the confronting surface portions of runner segments being located only along portions of the crown and portions of the band, and the confronting surface portions of the runner segments being located in between and spaced from adjacent blades of the composite runner,
wherein the composite runner has a central axis and the crown has a central circular shaped opening, and the confronting surface portions of the portions of the crown in plan view extend from the central opening radial offset from the central axis.

2. The split runner of claim 1, wherein the runner segments are joined together by a welded joint.

3. The split runner of claim 2, wherein a weld material is utilized in the welded joint that does not require post weld heat treatment.

4. The split runner of claim 3, wherein the weld material comprises E309L weld material.

5. The split runner of claim 2, wherein the confronting surface portions, are located midway between the adjacent blades.

6. The split runner of claim 1, wherein the confronting surface portions, are located midway between the adjacent blades.

7. The split runner of claim 1, wherein each of the plurality of blades has opposing surfaces of predetermined contour and the confronting surface portions that extend along portions of the crown and portions of the band extend along contours corresponding to the blade contour adjacent the crown and adjacent the band.

* * * * *